United States Patent
Schmidt et al.

(10) Patent No.: US 12,180,120 B2
(45) Date of Patent: Dec. 31, 2024

(54) RAPID PROCESSING OF LAMINAR COMPOSITE COMPONENTS

(71) Applicant: Raytheon Technologies Corporation, Farmington, CT (US)

(72) Inventors: Wayde R. Schmidt, Pomfret Center, CT (US); Paul Sheedy, Bolton, CT (US)

(73) Assignee: RTX CORPORATION, Farmington, CT (US)

( * ) Notice: Subject to any disclaimer, the term of this patent is extended or adjusted under 35 U.S.C. 154(b) by 375 days.

(21) Appl. No.: 17/649,750

(22) Filed: Feb. 2, 2022

(65) Prior Publication Data

US 2022/0153652 A1    May 19, 2022

Related U.S. Application Data

(62) Division of application No. 16/416,042, filed on May 17, 2019, now Pat. No. 11,267,763.

(51) Int. Cl.
  *C04B 35/64* (2006.01)
  *C04B 35/626* (2006.01)
  (Continued)

(52) U.S. Cl.
  CPC .......... *C04B 35/64* (2013.01); *C04B 35/6269* (2013.01); *C04B 35/62863* (2013.01);
  (Continued)

(58) Field of Classification Search
  CPC ............... C04B 35/64; C04B 35/6269; C04B 35/32863; C04B 35/62884; C04B 35/62886; C04B 35/657; C04B 2235/3826; C04B 2235/5244; C04B 2235/5256; C04B 2235/6025; C04B 2235/614; C04B 2235/616; C04B 2235/666; C04B 2235/667; C04B 2235/9669; F01D 5/02; F01D 5/147; F01D 9/02; F01D 25/08;
  (Continued)

(56) References Cited

U.S. PATENT DOCUMENTS

| | | |
|---|---|---|
| 6,333,000 B1 | 12/2001 | Garrigus |
| 7,456,942 B1 | 11/2008 | Curley et al. |
| (Continued) | | |

FOREIGN PATENT DOCUMENTS

| | | |
|---|---|---|
| EP | 3009256 A1 | 4/2016 |
| EP | 3093140 A1 | 11/2016 |
| EP | 3712122 A1 | 9/2020 |

OTHER PUBLICATIONS

First Communication Pursuant to Article 94(3) EPC for EP Application No. 20174816.7, Dated Feb. 13, 2023, pp. 6.
(Continued)

*Primary Examiner* — Jeremy R Pierce
(74) *Attorney, Agent, or Firm* — Kinney & Lange, P. A.

(57) ABSTRACT

A method of manufacturing a CMC structure includes infiltrating a porous substrate with a composite material and performing a first densification on the infiltrated porous substrate, forming a first densified porous substrate, wherein the first densification includes techniques selected from the group of techniques comprising photonic curing, photonic sintering, pulsed thermal heating, or combinations thereof.

20 Claims, 1 Drawing Sheet

(51) Int. Cl.
*C04B 35/628* (2006.01)
*C04B 35/657* (2006.01)
*F01D 5/02* (2006.01)
*F01D 5/14* (2006.01)
*F01D 9/02* (2006.01)
*F01D 25/08* (2006.01)
*F01D 25/24* (2006.01)
*F23R 3/00* (2006.01)

(52) U.S. Cl.
CPC .. *C04B 35/62884* (2013.01); *C04B 35/62886* (2013.01); *C04B 35/657* (2013.01); *C04B 2235/3826* (2013.01); *C04B 2235/5244* (2013.01); *C04B 2235/5256* (2013.01); *C04B 2235/6025* (2013.01); *C04B 2235/614* (2013.01); *C04B 2235/616* (2013.01); *C04B 2235/666* (2013.01); *C04B 2235/667* (2013.01); *C04B 2235/9669* (2013.01); *F01D 5/02* (2013.01); *F01D 5/147* (2013.01); *F01D 9/02* (2013.01); *F01D 25/08* (2013.01); *F01D 25/24* (2013.01); *F05D 2230/22* (2013.01); *F05D 2300/21* (2013.01); *F05D 2300/2261* (2013.01); *F05D 2300/228* (2013.01); *F23R 3/002* (2013.01)

(58) Field of Classification Search
CPC .. F01D 25/24; F05D 2230/22; F05D 2300/21; F05D 2300/2261; F05D 2300/228; F23R 3/002
See application file for complete search history.

(56) References Cited

U.S. PATENT DOCUMENTS

| | | | |
|---|---|---|---|
| 9,631,283 | B2 | 4/2017 | Schroder et al. |
| 2011/0268243 | A1 | 11/2011 | Hallstadius et al. |
| 2015/0197456 | A1* | 7/2015 | Oboodi ............. C04B 41/009 |
| | | | 427/446 |
| 2015/0291473 | A1 | 10/2015 | Schmidt |
| 2016/0011543 | A1 | 1/2016 | Qi et al. |
| 2016/0174385 | A1 | 6/2016 | Okabe et al. |
| 2016/0332416 | A1* | 11/2016 | Troester ............. B33Y 30/00 |
| 2017/0074110 | A1* | 3/2017 | Fremont ............. F01D 9/041 |
| 2018/0190593 | A1 | 7/2018 | Gaines et al. |

OTHER PUBLICATIONS

Extended European Search Report for EP Application No. 20174816.7, Dated Oct. 5, 2020, pp. 7.

* cited by examiner

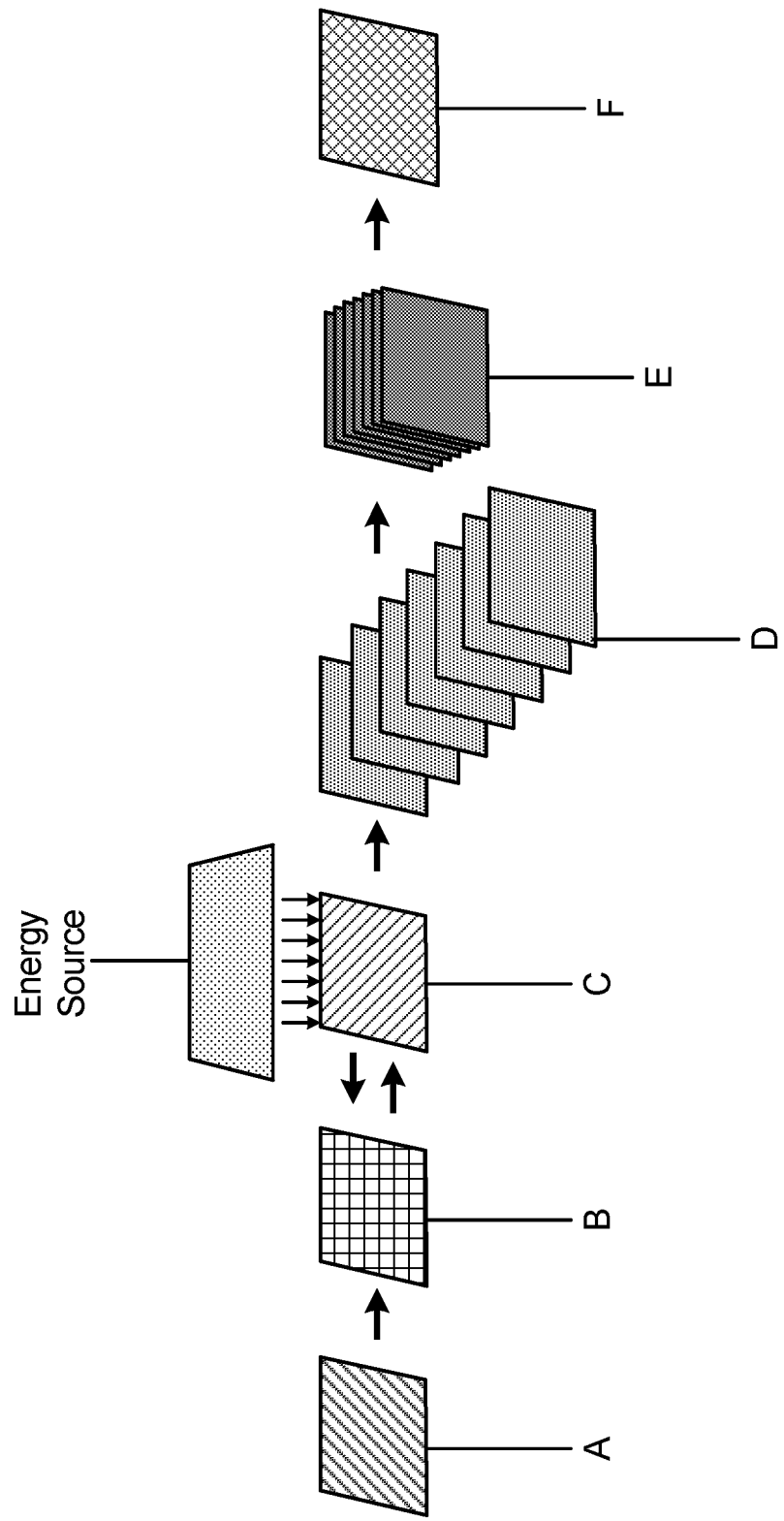

RAPID PROCESSING OF LAMINAR COMPOSITE COMPONENTS

CROSS-REFERENCE TO RELATED APPLICATION(S)

This application is a divisional of U.S. application Ser. No. 16/416,042 filed May 17, 2019 for "RAPID PROCESSING OF LAMINAR COMPOSITE COMPONENTS" by W. R. Schmidt and P. Sheedy.

BACKGROUND

The present disclosure relates generally to ceramic matrix composite (CMC) structures. More specifically, the present disclosure relates to the rapid processing of CMC structures.

Typical Ceramic Matrix Composite (CMC) structures comprise either fiber based plies or foam structures layered into a preform which may then be densified and machined to a final form. Traditional fabrication of CMC structures tends to rely on processes such as Chemical Vapor Infiltration (CVI), Melt Infiltration (MI), and Polymer Infiltration and Pyrolysis (PIP). However, the present techniques are limited in their ability to produce CMC structures capable of withstanding the cyclic high temperatures and pressures that may be present in a gas turbine engine, for example, 2400° F. (1316° C.) or above. Additionally, traditional bulk densification of CMC preforms tends to induce, for example, thermal stresses, mechanical stresses, and shrinkage, with such issues generally increasing in proportion to the preform thickness. In other words, a greater thickness or number of plies assembled together increases the internal stresses experienced by the CMC. Furthermore, thicker assemblies also may require longer processing times, require multiple infiltration steps, excessive temperatures to cure relative to the stability of the materials, or result in a component with residual porosity or undesirable phases. This can be due to larger diffusion or infiltration distances for gasses and/or liquids applied to the preform in the densification processes.

SUMMARY

A method of manufacturing a CMC structure includes infiltrating a porous substrate with a composite material and performing a first densification on the infiltrated porous substrate, forming a first densified porous substrate, wherein the first densification includes techniques selected from the group of techniques comprising photonic curing, photonic sintering, pulsed thermal heating, or combinations thereof.

BRIEF DESCRIPTION OF THE DRAWINGS

FIG. 1 is a method of manufacturing a laminar composite component.

DETAILED DESCRIPTION

Disclosed, herein, is a method for applying photonic curing, photonic sintering or pulsed thermal heating to individual layers of treated fiber reinforcement architectures that can be subsequently stacked and further processed. Applying energy to the individual layers rather than multiple already assembled plies can reduce the exposure time at high temperatures for the individual plies and infiltrated materials, which can reduce the amount and degree of the internal stresses in the final component. The manufacturing time of the overall process can also be significantly reduced compared to traditional bulk manufacturing methods. Furthermore, appropriate materials can be selected along with the amount and type of energy applied to tailor the creation of desired reaction products. For example, refractory metals can react with residual carbon to locally create refractory carbides at significantly lower temperatures than are possible using bulk processing techniques.

FIG. 1 is a method of manufacturing a laminar composite component. FIG. 1 shows structures A, B, C, D, E, and F formed during manufacturing of the laminar composite component.

Structure A is a porous substrate formed as a single layered ply, which can be any substrate capable of being formed into a CMC. Porous substrates can be, for example, cellular foams, unitapes, woven fabrics, non-woven fabrics (including unidirectional fabrics), knits, braids, chopped fiber mats or formed of metal, glass, ceramics, carbon, polymers, or combinations thereof. When fibers are used to make the porous substrate they may be continuous, discontinuous, individual or contained in fiber tows of varying densities, diameters and lengths. Structure A can be supplied as cut pieces or as a continuous sheet or tow with a defined feed rate.

Structure B is a preform composite and is formed by introducing an additive agent to the single layered ply, which can be introduced using a variety of methods such as, for example, slurry infiltration, vapor infiltration, resin infiltration, doctor blading, filtration, polymer infiltration, atomic layer deposition, chemical vapor deposition, preceramic polymer infiltration, melt infiltration, or combinations thereof. Additive agents can be, for example, coated additive agents, metals, ceramics, or carbon and having, for example, a colloidal or nanoparticulate structure. Additive agents may be crystalline, noncrystalline, amorphous, turbostratic or semi crystalline. For further example, one embodiment of the method can use a preceramic polymer resin as the additive agent. An alternate embodiment can use a preceramic polymer resin, filled with silicon carbide and silicon powders, as the additive agents. An alternate embodiment can use additive agents to only coat the surface of the preform composite. Structure B can be formed as individual pieces or as a continuous sheet or tow with a defined feed rate. Using a continuous sheet or tow can help to ensure a consistent quality and a steady throughput during the process. A continuous sheet can have a uniform shape and size that yields consistent results, whereas, individual pieces designed for various components may vary widely in their size and shape and not be manufactured as consistently as a continuous sheet process.

Structure C is the preform composite of structure B exposed to a densification step. In other words, structure C has a greater density compared to structure B. Structure C can be substantially fully densified or only nominally densified or to any extent there between. Structure B can be exposed to, for example, a flash lamp, photonic curing, photonic sintering, pulsed thermal heating, or combinations thereof (the energy source shown in FIG. 1) to at least partially densify structure B.

For example, structure C can be formed from materials such as a silicon-carbide fibers in a silicon-carbide matrix, carbon fibers in a carbon matrix, carbon fibers in a silicon-carbide matrix, or likewise an alumina matrix, mullite matrix, or a zirconium diboride matrix. Structure C can be formed of borides, carbides, oxides, and/or nitrides. The borides can be selected from the group consisting of $ZrB_2$, $HfB_2$, $VB_2$, $TiB_2$, $TaB_2$, $TaB$, $NbB_2$, $NbB$, $VB_2$, $TiB_2$, $CrB_2$, $Mo_2B_5$, $W_2B_5$, $Fe_2B$, $FeB$, $Ni_2B$, $NiB$, $LaB_6$, $CoB$, $Co_2B$, or combinations thereof. The carbides can be selected from the group consisting of SiC, HfC, ZrC, C, $B_4C$, SiOC, TiC, TiOC, WC, $Mo_2C$, TaC, NbC, other oxycarbides, or combinations thereof. The oxides can be selected from the group consisting of $HfO_2$, $ZrO_2$, $Al_2O_3$, $SiO_2$, and combinations thereof. Other oxides can be selected from the group consisting of aluminosilicates, borosilicates, lithium aluminosilicates (LAS), magnesium aluminosilicates, barium magnesium aluminosilicates (BMAS), calcium aluminosilicates, other mixed metal oxides, and combinations thereof. The nitrides can be selected from the group consisting of AN, $Si_3N_4$, TaN, TiN, TiAlN, $W_2N$, WN, $WN_2$, VN, ZrN, BN, HfN, NbN, oxynitrides, and combinations thereof.

The porous substrate, the additive agent, and the densification method can be selected based on the desired properties of the final component. For example, components that will be subjected to higher temperatures in a turbine engine can be formed from materials and by methods which promote the creation of reaction products capable of tolerating cyclic high temperatures. Additionally, in photonic curing, individual wavelengths or range of wavelengths or spectral characteristics can be used to promote the formation of specific molecular species and compounds and formation of specific crystal structures that may impact desired functionality of the CMC. Structure C can be formed using a single method in one or more steps or be formed using more than one method in a stepwise fashion.

For example, an additive agent can be infiltrated into the porous substrate and then partially densified using a first densification method. Either the same additive agent or a different additive agent can be infiltrated into the porous substrate and partially densified using the first densification method. More of the same additive agent or a different additive agent can be infiltrated into the porous substrate and partially densified using the first densification method. This can continue in an iterative process until a particular property has been achieved such as, for example, a sufficient density, strength or corrosion resistance to withstand the cyclic high pressures and temperatures present in a gas turbine engine under load.

For further example, an additive agent can be infiltrated into the porous substrate and then partially densified using a first densification method. Either the same additive agent or a different additive agent can be infiltrated into the porous substrate and partially densified using a second densification method. More of the same additive agent or a different additive agent can be infiltrated into the porous substrate and partially densified using a third densification method. This can continue in an iterative process until a particular property has been achieved such as, for example, a sufficient density, strength, or corrosion resistance to withstand the cyclic high pressures and temperatures present in a gas turbine engine under load.

Structure D is a layered structure formed of a plurality of the exposed individual preform composite plies. For example, structure D can include a plurality of plies that are stacked, layered, or wrapped together. Structure D can be formed to display desired properties. For example, as unidirectional nonwoven fabrics may be very strong in one direction, individual plies may be stacked to impart a more uniform strength in a finished component. In such a case, the individual plies can be stacked at angles offset from neighboring plies such as, for example, at 90, 45, or 10 degree increments. Furthermore, stacked plies may be relatively resistant to compressive loading forces but, in response to shear loading forces applied relatively in plane to the plies, may tend to delaminate the assembled structure. Where shear forces are anticipated, structure D can be formed into braids, for example, or other structures that don't lie in a single plane. Structure D may contain layers having the same or different compositions and architectures.

Structure E is formed by exposing structure D to a second densification process. The second densification process can be hot isostatic processing (HIP), field assisted sintering technique/spark plasma sintered (FAST/SPS), melt infiltration, chemical vapor infiltration, polymer infiltration and pyrolysis (PIP), glass transfer molding (GTM), or combinations thereof. Structure E is a substantially fully densified assembly and may include other structures such as interface layers in between each of the individual plies or in between some of the individual plies. For example, the interface layer can have a particulate, a chopped fiber, a nanotube, and a slurry. Particulate compositions can be formed of carbides, oxides, nitrides and borides, and have morphologies ranging from spherical to acicular or elongated, and sizes ranging from nanometer to submicron to tens of microns. Chopped fibers can be carbon, silicon carbide or other carbides, silicon nitride or other nitrides, silicon oxycarbide and oxides or glasses and combinations thereof. Slurries can be aqueous or organic solvent based suspensions/dispersions of ceramic, metal or carbonaceous particulates, platelets, nanotubes or nanofibers. The interface layer and structure D can then be densified to form structure E.

Structure F is the final component. Structure F is formed by performing secondary processing steps on structure E. Secondary steps may include adding a shell or coating onto structure E to impart desired characteristics. For example, a coating may be applied to provide a vapor barrier on the component or a metallic shell or coating may be applied to increase the structural integrity or increase the heat resistance or environmental protection of the component. Additionally, secondary processing steps may include trimming or machining any excess material or remove any unreacted additive agents from the CMC. Secondary processing may also include adding structural features such as cooling holes to the component. Structure F can be any CMC structure such as, for example, airfoils, blades, vanes, disks, nozzles, diffusers, combustors, seals, rotors, cases, heatshields, beams, plates, and any other suitable article of manufacture.

Partially densifying the preform composite as an individual ply before it is assembled into a plurality of plies can reduce the amount of stress experienced by the CMC during manufacturing. For example, heating and subsequent cooling of an individual ply can be achieved on the order of micro- or milli-seconds compared to hours for some CMC structures. As such, the duration of time the plies are exposed to heat or thermal energy can be significantly reduced. The heat or thermal energy may also be effectively applied locally. In other words, only the areas of the ply necessary for densification are heated compared to traditional processes where the entire CMC structure is heated. The CMC structure may also require less heat to be applied when combined with photonic curing. For example, refractory metals can react with residual carbon when specific wavelengths of light are applied to locally create refractory carbides at significantly lower temperatures compared to bulk processing. Photonic curing may additionally promote the formation of different crystal structures within the CMC.

Furthermore, partially densifying the preform composite as an individual ply can be easier to handle during the first densification step compared to an already assembled CMC. The additive agent or infiltrate material can be more efficiently used. The infiltrate material may be applied only on selected areas of an individual ply, whereas, much more infiltrate material is used on an assembled plurality of plies with much less local control during the application process. This can also help to reduce the amount of pores and cracks present in the final CMC structure and promote the growth of a fine grain structure with improvements in the crystallinity of the final structure, the extent of completed reaction of the infiltrate material, and the final density of the CMC compared to pre-assembled structures undergoing a single densification step.

Discussion of Possible Embodiments

The following are non-exclusive descriptions of possible embodiments of the present invention.

A method of manufacturing a CMC structure includes infiltrating a porous substrate with a composite material and performing a first densification on the infiltrated porous substrate, forming a first densified porous substrate, wherein the first densification includes techniques selected from the group of techniques comprising photonic curing, photonic sintering, pulsed thermal heating, or combinations thereof.

The method of the preceding paragraph can optionally include, additionally and/or alternatively, any one or more of the following features, configurations and/or additional components:

The method includes assembling a plurality of the porous substrates, including a plurality of the first densified porous substrates and performing a second densification on the assembled plurality of porous substrates, forming a second densified porous substrate.

The performing a second densification is via at least one of a Field Assisted Sintering Technique (FAST), a Spark Plasma Sintering (SPS) process, or a localized heating at a bonding interface.

The porous substrate is selected from the group consisting of cellular foams, unitapes, woven fabrics, non-woven fabrics, knits, braids, chopped fiber mats, or combinations thereof.

The porous substrate is formed of a material selected from the group consisting of metals, glasses, ceramics, carbon, polymers, or combinations thereof.

The infiltrating a porous substrate is selected from the group of techniques consisting of slurry infiltration, vapor infiltration, resin infiltration, doctor blading, filtration, polymer infiltration, melt infiltration (MI), preceramic polymer infiltration, Chemical Vapor Deposition (CVD), Chemical Vapor Infiltration (CVI), Atomic Layer Deposition (ALD), or combinations thereof.

The composite material is selected from the group consisting of a carbides, oxides, nitrides, borides, or combinations thereof.

The composite material is a silicon carbide matrix with silicon carbide fibers.

The first densification is performed on individual cut plies of the porous substrate.

The first densification is performed on a continuous tow of a single ply of the porous substrate.

The CMC structure is one of an airfoil, blade, vane, disk, nozzle, diffuser, combustor, seal, rotor, case, heatshield, beam, plate, and any other suitable article of manufacture.

A turbine engine component includes a Ceramic Matrix Composite (CMC) structure manufactured by the preceding method.

A method of manufacturing a gas turbine engine component includes infiltrating a porous substrate with a composite material and performing a first densification on the infiltrated porous substrate and the composite material, forming a first densified porous substrate, wherein the first densification includes techniques selected from the group of techniques comprising photonic curing, photonic sintering, pulsed thermal heating, or combinations thereof. The method includes assembling a plurality of the porous substrates, including a plurality of the first densified porous substrates and performing a second densification on the assembled plurality of porous substrates, forming a second densified porous substrate, which is via at least one of a Field Assisted Sintering Technique (FAST), a Spark Plasma Sintering (SPS) process, or a localized heating at a bonding interface.

The method of the preceding paragraph can optionally include, additionally and/or alternatively, any one or more of the following features, configurations and/or additional components:

The porous substrate is selected from the group consisting of cellular foams, unitapes, woven fabrics, non-woven fabrics, knits, braids, chopped fiber mats, or combinations thereof.

The porous substrate is formed of a material selected from the group consisting of metals, glasses, ceramics, carbon, polymers, or combinations thereof.

The infiltrating a porous substrate is selected from the group of techniques consisting of slurry infiltration, vapor infiltration, resin infiltration, doctor blading, filtration, polymer infiltration, melt infiltration (MI), preceramic polymer infiltration, Chemical Vapor Deposition (CVD), Chemical Vapor Infiltration (CVI), Atomic Layer Deposition (ALD), or combinations thereof.

The composite material is selected from the group consisting of a carbides, oxides, nitrides, borides, or combinations thereof.

The composite material is a silicon carbide matrix with silicon carbide fibers.

The CMC structure is one of an airfoil, blade, vane, disk, nozzle, diffuser, combustor, seal, rotor, case, heatshield, beam, plate, and any other suitable article of manufacture.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine engine component, comprising:
 a laminar Ceramic Matrix Composite (CMC) structure manufactured by the method comprising:
 infiltrating a porous substrate with a composite material;
 performing a first densification on the infiltrated porous substrate and the composite material, forming a first densified porous substrate, wherein the first densification includes techniques selected from the group of techniques consisting of photonic curing, photonic sintering, pulsed thermal heating, and combinations thereof;
 repeating the above steps a predetermined number of times to form a plurality of first densified porous substrates;
 assembling the plurality of the first densified porous substrates, forming a layered structure of the plurality of the first densified porous substrates, wherein forming a layered structure of the plurality of the first densified porous substrates includes forming an interface layer between at least some of the first densified porous substrates, wherein the interface layer comprises a particulate composition, chopped fibers, or a suspension or dispersion of ceramic, metal, or carbonaceous particulates, platelets, nanotubes, or nanofibers; and performing a second densification on the layered structure of the plurality of first densified porous substrates, forming a second densified porous substrate;

wherein the laminar CMC structure comprises a second densified porous substrate having a plurality of first densified porous substrates that have an interface layer positioned between at least some of the first densified porous substrates.

2. The turbine engine component of claim 1 wherein performing a second densification is via at least one of a Field Assisted Sintering Technique (FAST), a Spark Plasma Sintering (SPS) process, or a localized heating at a bonding interface.

3. The turbine engine component of claim 1, wherein the porous substrate is selected from the group consisting of cellular foams, unitapes, woven fabrics, non-woven fabrics, knits, braids, chopped fiber mats, and combinations thereof and the porous substrate is formed of a material selected from the group consisting of metals, glasses, ceramics, carbon, polymers, and combinations thereof.

4. The turbine engine component of claim 1, wherein infiltrating a porous substrate is selected from the group of techniques consisting of slurry infiltration, vapor infiltration, resin infiltration, doctor blading, filtration, polymer infiltration, melt infiltration (MI), preceramic polymer infiltration, Chemical Vapor Deposition (CVD), Chemical Vapor Infiltration (CVI), Atomic Layer Deposition (ALD), and combinations thereof.

5. The turbine engine component of claim 1, wherein the composite material is selected from the group consisting of a carbides, oxides, nitrides, borides, and combinations thereof.

6. The turbine engine component of claim 1, wherein each of the plurality of first densified substrates comprises a silicon carbide matrix with silicon carbide fibers.

7. The turbine engine component of claim 1, wherein the first densification is performed on individual cut plies of the porous substrate.

8. The turbine engine component of claim 1, wherein the first densification is performed on a continuous tow of a single ply of the porous substrate.

9. The turbine engine component of claim 1, wherein the CMC structure is one of an airfoil, blade, vane, disk, nozzle, diffuser, combustor, seal, rotor, case, heatshield, beam, or plate.

10. A gas turbine engine component, manufactured by the method comprising:

infiltrating a porous substrate with a composite material;

performing a first densification on the infiltrated porous substrate and the composite material, forming a first densified porous substrate, wherein the first densification includes techniques selected from the group of techniques consisting of photonic curing, photonic sintering, pulsed thermal heating, and combinations thereof;

repeating the above steps a predetermined number of times to form a plurality of first densified porous substrates;

assembling the plurality of the first densified porous substrates, forming a layered structure of the plurality of the first densified porous substrates, wherein forming a layered structure of the plurality of the first densified porous substrates includes forming an interface layer between at least some of the first densified porous substrates, wherein the interface layer comprises a particulate composition, chopped fibers, or a suspension or dispersion of ceramic, metal, or carbonaceous particulates, platelets, nanotubes, or nanofibers; and performing a second densification on the layered structure of the plurality of the first densified porous substrates, forming a second densified porous substrate, wherein performing the second densification is via at least one of a Field Assisted Sintering Technique (FAST), a Spark Plasma Sintering (SPS) process, or a localized heating at a bonding interface;

wherein the gas turbine engine component comprises a second densified porous substrate having a plurality of first densified porous substrates that have an interface layer positioned between at least some of the first densified porous substrates.

11. The gas turbine engine component of claim 10, wherein the porous substrate is selected from the group consisting of cellular foams, unitapes, woven fabrics, non-woven fabrics, knits, braids, chopped fiber mats, and combinations thereof and wherein the porous substrate is formed of a material selected from the group consisting of metals, glasses, ceramics, carbon, polymers, and combinations thereof.

12. The gas turbine engine component of claim 10, wherein infiltrating a porous substrate is selected from the group of techniques consisting of slurry infiltration, vapor infiltration, resin infiltration, doctor blading, filtration, polymer infiltration, melt infiltration (MI), preceramic polymer infiltration, Chemical Vapor Deposition (CVD), Chemical Vapor Infiltration (CVI), Atomic Layer Deposition (ALD), and combinations thereof.

13. The gas turbine engine component of claim 10, wherein the composite material is selected from the group consisting of a carbides, oxides, nitrides, borides, and combinations thereof.

14. The gas turbine engine component of claim 10, wherein each of the plurality of first densified substrates comprises a silicon carbide matrix with silicon carbide fibers.

15. The gas turbine engine component of claim 10, wherein the gas turbine engine component is one of an airfoil, blade, vane, disk, nozzle, diffuser, combustor, seal, rotor, case, heatshield, beam, or plate.

16. A gas turbine engine component, comprising:

a densified porous substrate that comprises a densified layered structure of a plurality of first densified porous substrates, wherein each of the plurality of first densified substrates comprises a porous substrate infiltrated with composite material, wherein:

the porous substrate is selected from the group consisting of cellular foams, unitapes, woven fabrics, non-woven fabrics, knits, braids, chopped fiber mats, and combinations thereof and is formed of a material selected from the group consisting of metals, glasses, ceramics, carbon, polymers, and combinations thereof; and the composite material is selected from the group consisting of a carbides, oxides, nitrides, borides, and combinations thereof;

wherein the densified layered structure of the plurality of the first densified porous substrates includes an interface layer between at least some of the first densified porous substrates, wherein the interface layer comprises a particulate composition, chopped fibers, or a suspension or dispersion of ceramic, metal, or carbonaceous particulates, platelets, nanotubes, or nanofibers wherein the densified layered structure of the plurality of the first densified porous substrates has been subjected to a second densification step to form a second densified porous substrate having a plurality of first densified porous substrates that have an interface layer positioned between at least some of the first densified porous substrates.

17. The gas turbine engine component of claim 16, wherein each of the plurality of first densified substrates comprises a silicon carbide matrix with silicon carbide fibers.

18. The gas turbine engine component of claim 16, wherein the layered structure of the plurality of the first densified porous substrates has been densified to form the densified porous substrate via at least one of a Field Assisted Sintering Technique (FAST), a Spark Plasma Sintering (SPS) process, or a localized heating at a bonding interface; and each of the plurality of first densified substrates comprises a porous substrate infiltrated with composite material, wherein the porous substrate infiltrated with composite material has been densified using techniques selected from the group of techniques consisting of photonic curing, photonic sintering, pulsed thermal heating, and combinations thereof.

19. The gas turbine engine component of claim 16, wherein the gas turbine engine component is one of an airfoil, blade, vane, disk, nozzle, diffuser, combustor, seal, rotor, case, heatshield, beam, or plate.

20. The gas turbine engine component of claim 16, wherein the a densified porous substrate is coated to increase structural integrity, heat resistance, or environmental protection.

* * * * *